(12) United States Patent
Keller et al.

(10) Patent No.: US 8,741,438 B2
(45) Date of Patent: *Jun. 3, 2014

(54) COMPOSITE GLAZING HAVING FILMS CONTAINING SOFTENING AGENTS HAVING LOW TENDENCY TO CREEP

(75) Inventors: Uwe Keller, Bonn (DE); Martin Steuer, Liederbach (DE)

(73) Assignee: Kuraray Europe GmbH, Hattersheim (DE)

( * ) Notice: Subject to any disclaimer, the term of this patent is extended or adjusted under 35 U.S.C. 154(b) by 160 days.

This patent is subject to a terminal disclaimer.

(21) Appl. No.: 13/508,921

(22) PCT Filed: Nov. 10, 2010

(86) PCT No.: PCT/EP2010/067160
§ 371 (c)(1),
(2), (4) Date: May 10, 2012

(87) PCT Pub. No.: WO2011/058026
PCT Pub. Date: May 19, 2011

(65) Prior Publication Data
US 2012/0225287 A1    Sep. 6, 2012

(30) Foreign Application Priority Data
Nov. 11, 2009   (EP) ..................................... 09175666

(51) Int. Cl.
*B32B 17/10* (2006.01)
(52) U.S. Cl.
USPC .......................................... 428/436; 428/437
(58) Field of Classification Search
USPC ................................................ 428/436, 437
See application file for complete search history.

(56) References Cited

U.S. PATENT DOCUMENTS

| | | | |
|---|---|---|---|
| 5,187,217 A | 2/1993 | Degeilh et al. | |
| 2009/0250100 A1 | 10/2009 | Hayes et al. | |
| 2010/0028642 A1 | 2/2010 | Steuer et al. | |
| 2010/0307585 A1 * | 12/2010 | Keller et al. | 136/259 |

FOREIGN PATENT DOCUMENTS

| | | |
|---|---|---|
| DE | 28 38 025 A1 | 3/1979 |
| EP | 0185863 A1 | 7/1986 |
| EP | 0211819 A1 | 2/1987 |
| EP | 0387148 B1 | 8/1993 |
| EP | 1118258 B1 | 3/2003 |
| EP | 1384731 A1 | 1/2004 |
| EP | 1527107 B1 | 5/2005 |
| EP | 1606325 A1 | 12/2005 |
| EP | 1622946 A1 | 2/2006 |
| EP | 2153989 A1 | 2/2010 |
| GB | 2007677 A | 5/1979 |
| JP | 1318009 A | 12/1989 |
| WO | 02/102591 A1 | 12/2002 |
| WO | 03/020776 A1 | 3/2003 |
| WO | 03/033583 A1 | 4/2003 |
| WO | 2004/005358 A1 | 1/2004 |
| WO | 2004/063231 A1 | 7/2004 |
| WO | 2004063232 A1 | 7/2004 |
| WO | 2005/070669 A1 | 8/2005 |
| WO | 2009/047221 A2 | 4/2009 |
| WO | 2009/047222 A2 | 4/2009 |
| WO | 2009/047223 A2 | 4/2009 |

\* cited by examiner

*Primary Examiner* — Dhirajlal S Nakarani
(74) *Attorney, Agent, or Firm* — Brooks Kushman P.C.

(57) ABSTRACT

Composite glass laminates having low tendency to creep contain a softening agent-containing polyvinyl acetal film wherein the polyvinyl acetal has a polyvinyl alcohol content of 12 to 16 weight percent, a molecular weight greater than 110,000 g/mol, and a solution viscosity of more than 80 mPas.

11 Claims, 1 Drawing Sheet

COMPOSITE GLAZING HAVING FILMS CONTAINING SOFTENING AGENTS HAVING LOW TENDENCY TO CREEP

This application is the U.S. national phase of PCT Appln. No. PCT/EP2010/067160 filed Nov. 10, 2010 which claims priority to European application EP 09175666.8 filed Nov. 11, 2009 which are incorporated herein by reference.

BACKGROUND OF THE INVENTION

1. Field of the Invention

The invention relates to the production of composite glazings with use of films based on polyvinyl acetal and containing softening agent(s) having low tendency to creep.

2. Description of the Related Art

Composite safety glasses generally consist of two glass panes and an intermediate film connecting the glass panes. Partially acetalated polyvinyl alcohol (polyvinyl acetal), in particular polyvinyl butyral (PVB), containing softening agent(s) is used predominantly as a film material. Composite safety glasses (CSG) are used for example as windscreens or side glazings in the automotive field and as safety glazing in the construction industry.

Aliphatic diesters of triethylene glycol and tetraethylene glycol have become established as preferred softening agents for such PVB films. 3G7, 3G8 or 4G7 are used particularly frequently as softening agents, wherein the first figure denotes the number of ethylene glycol units and the last figure denotes the number of carbon atoms in the carboxylic acid part of the compound. 3G8 thus stands for triethylene glycol bis(2-ethylhexanoate), that is to say for a compound of formula $C_4H_9CH(CH_2CH_3)CO(OCH_2CH_2)_3O_2CCH(CH_2CH_3)C_4H_9$.

Compounds which, in a CSG intermediate film, ensure high transparency, low moisture absorption, good adhesion to the glass and sufficient low-temperature flexibility of the film are preferably used as softening agents for partially acetalated polyvinyl alcohols. Furthermore, these compounds must have sufficient compatibility with the partially acetalated polyvinyl alcohol, that is to say they must be miscible therewith in a sufficient amount without exuding again.

The compatibility of a softening agent and partially acetalated polyvinyl alcohol generally decreases with the diminishing polar nature of the softening agent. Softening agents of higher polarity are thus more compatible with polyvinyl acetal than those of lower polarity. Alternatively, the compatibility of softening agents of lower polarity increases with a rise in the degree of acetalation, that is to say with a decrease in the number of hydroxyl groups and therefore a decrease in the polarity of the polyvinyl acetal.

PVB film is produced on an industrial scale predominantly with 3G8 as a softening agent.

The moisture absorption of a PVB film and its associated resistance to the formation of defects with long-term use is basically determined by the degree of acetalation and the polyvinyl alcohol content of the PVB polymer used in the formulation.

At the same time, due to reasons of compatibility, the relatively high polyvinyl alcohol contents present in the polyvinyl acetals normally used on an industrial scale in PVB film require the use of the aforementioned, comparatively polar softening agents, which also have a comparatively low molecular weight and therefore comparatively high volatility.

A PVB film which is optimal for long-lasting architectural glazing should therefore rather be based on a hydrophobic PVB having a low polyvinyl alcohol content. Hydrophobic PVBs can be combined with less polar softening agents; that is to say they are compatible therewith.

At the same time, when using PVB film in the architectural field, high demands are placed on the mechanical behaviour of a PVB film. This concerns not only the tear strength of the film, but also the resistance thereof to slow slip (creep) from individual glass panes which are held only by the film, are sometimes a few mm thick and are therefore heavy. In particular if a CSG is only glued on the rear face in a façade support structure and the front glass panel is not provided with extra mechanical support, this can lead to defects.

The need for a PVB film which has both a low polyvinyl alcohol content (and therefore improved long-term stability) and also low tendency to creep (and is therefore suitable for lamination of thick individual glass panes) cannot be met easily however, since even films based on highly acetalated PVB tend to creep at increased temperature. Since, depending on the field of use, sustained temperatures of more than 60° C. can be observed in the CSG, both in the case of architectural and automotive applications, the use of PVB film based on PVB having a low polyvinyl alcohol content is normally ruled out.

Films having specific mechanical properties are known for example, from EP 2153989. In this case, polyvinyl acetals having a polyvinyl alcohol content of 17 to 22% by weight are used. These polyvinyl acetals do not have satisfactory creep properties.

WO 2009/047221, WO 2009/047222 and WO 2009/047223 describe the production of photovoltaic modules having films made of polyvinyl acetals and containing softening agent(s). The polyvinyl acetals used in this case likewise have a high polyvinyl alcohol content and therefore insufficient creep properties.

In US 2009/0250100, polyvinyl acetals having a melt flow index MFR of 0.8 to 2 g/10 min (at 150° C., 5 kg) are described for photovoltaic modules. This value also indicates insufficient creep properties.

Since quality guarantees of more than 20 years sometimes have to be provided in the architectural field for composite glass laminates, there is a need to provide intermediate films having reduced moisture absorption and softening agent release, yet sufficiently low tendency to creep at increased temperature.

SUMMARY OF THE INVENTION

It has surprisingly been found that the tendency to creep, under temperature load and at a given degree of acetalation, of PVB film based on PVB having a polyvinyl alcohol content of less than 18% by weight is determined largely by the underlying raw materials employed in the synthesis of the polyvinyl acetal and by the type of reaction control, and are determined only to a lesser extent by the softening agent content of such a film.

In particular, it has been found that the tendency of a film based on polyvinyl acetal and containing softening agent(s) to creep under temperature load depends largely on the polyvinyl alcohol content, molecular weight and degree of crosslinking thereof, or on the acetalation conditions during the production process.

DETAILED DESCRIPTION OF THE PREFERRED EMBODIMENTS

Figure 1:
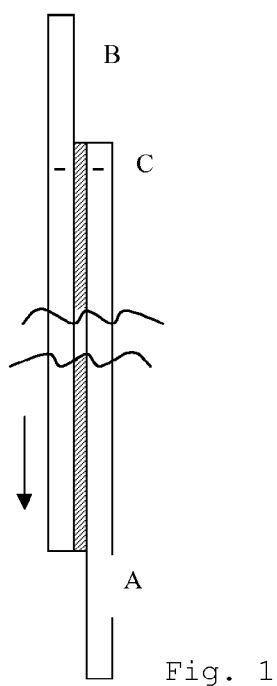
FIGS. 1 and 2 depict a method for measuring creep of a glazing laminate.

The present invention therefore relates to composite glass laminates consisting of a layered assembly formed of at least two glass panes having at least one interposed film formed of polyvinyl acetal and containing softening agent(s), wherein the film contains polyvinyl acetal having a polyvinyl alcohol fraction of 12 to 16% by weight and has a tendency to creep, determined on a laminate having a structure formed of 3 mm float glass/0.76 mm film/3 mm float glass, of less than 5 mm at a temperature of 100° C. after 7 days.

Films of this type are therefore particularly suitable for production of composite glass laminates according to the invention which have at least one glass pane with a thickness of more than 3 mm, preferably more than 4 mm, more preferably more than 5 mm, and most preferably more than 8 mm.

The tendency of the film based on polyvinyl acetal and containing softening agent(s) to creep is preferably less than 3 mm, more preferably less than 2 mm and most preferably less than 1 mm in the measurement methods described in greater detail hereinafter.

As already described, a sufficiently low polyvinyl alcohol content does not only act directly on the moisture absorption of the film, but is also a prerequisite for the fact that highly unipolar softening agents exhibit good compatibility with polyvinyl acetal, and therefore an additional contribution to moisture reduction can be obtained by selecting such a softening agent.

For this reason, polyvinyl acetals having polyvinyl alcohol contents of less than 18.0% by weight are used for films used in accordance with the invention. The polyvinyl acetals used in accordance with the invention preferably have a polyvinyl alcohol fraction of 12 to 16% by weight and in particular of 13 to 15% by weight. The polyvinyl alcohol fraction should not fall below 10% by weight due to high inherent tackiness and mechanical properties of the films produced therewith which are no longer sufficient.

In a first variant of the invention, polyvinyl acetals are used to produce the films which have a weight average molecular weight $M_w$ greater than 110,000 g/mol, preferably greater than 120,000 g/mol, and/or which have a solution viscosity greater than 80 mPas, preferably greater than 90 mPas. The molecular weight $M_w$ and solution viscosity are measured by means of gel permeation chromatography (GPC) and as a 5% solution of the polyvinyl acetals in ethanol, respectively, as stated in the examples.

So as not to impair the extrusion capability of the polyvinyl acetals, the molecular weight $M_w$ thereof should not be greater than 500,000 g/mol and/or the solution viscosity should not be greater than 300 mPas.

The molecular weight $M_w$ and solution viscosity are values determined macroscopically on the polyvinyl acetal which is used. Mixtures formed of a plurality of polyvinyl acetals can therefore also be used, the individual molecular weights and solution viscosities of which may lie above and below the provided threshold values. The mixing of a plurality of polyvinyl acetals to obtain a mixture having the aforementioned lower limits for molecular weight $M_w$ and solution viscosity is known to one skilled in the art.

Increased molecular weight and increased solution viscosity can be achieved by use of suitable polyvinyl alcohols for the production of polyvinyl acetals. The polyvinyl alcohols used to produce the polyvinyl acetals preferably have a solution viscosity of more than 35 mPas, measured as 4% aqueous solution. Within the scope of the present invention, the polyvinyl alcohols can be used in pure form or as a mixture of polyvinyl alcohols having a different degree of acetalation or degree of hydrolysis. If mixtures of polyvinyl alcohols are used, the solution viscosity thereof lies above 35 mPas in accordance with the invention.

With the same polyvinyl alcohol content, films containing polyvinyl acetals having the aforementioned specifications for molecular weight $M_w$ and solution viscosity are also practically equivalent in terms of further desired properties, such as high optical transparency compared to those based on polyvinyl acetal having a molecular weight $M_w<110,000$ g/mol and a solution viscosity of <80 mPas.

According to the known methods, the polyvinyl acetals necessary for production of the films used in accordance with the invention are obtained by reacting polyvinyl alcohols having a suitable molecular weight and residual acetate content with one or more aldehydes.

Within the scope of the present invention, terpolymers from hydrolysed vinyl acetate/ethylene copolymers may also be used as the polyvinyl alcohol, in addition to copolymers from vinyl alcohol and vinyl acetate. These compounds are generally hydrolysed to more than 98% and contain 1 to 10% by weight of units based on ethylene (for example of the "Exceval" type from Kuraray Europe GmbH).

Furthermore, within the scope of the present invention, hydrolysed copolymers from vinyl acetate and at least one further ethylenically unsaturated monomer can also be used as a polyvinyl alcohol.

It is possible to carry out the acetalation with aldehydes containing 2 to 10 carbon atoms, preferably with acetaldehyde, butyraldehyde or valeraldehyde.

In a further, second variant of the invention, the polyvinyl acetals used in accordance with the invention have an increased molecular weight and an increased solution viscosity by crosslinking through carboxyl groups, by polyaldehydes, glutardialdehyde or glyoxylic acid.

For example, crosslinked polyvinyl acetals are obtainable by intramolecular crosslinking of carboxyl-group-substituted polyvinyl acetals. For example, these can be produced by the co-acetalation of polyvinyl alcohols with polyaldehydes, glutardialdehyde or glyoxylic acid. The polyvinyl acetals obtained therefore most preferably have the lower limits already described for molecular weight $M_w$ and solution viscosity. From 0.001 to 1% of the OH groups originally contained in the polyvinyl acetal preferably react during crosslinking. The crosslinked polyvinyl acetals will exhibit similar solubility behaviour to the uncrosslinked polyvinyl acetals.

Suitable crosslinking options for polyvinyl acetals are described for example in EP 1527107 B1 and in WO 2004/063231 A1 (thermal self-crosslinking of polyvinyl acetals containing carboxyl groups), in EP 1606325 A1 (polyvinyl acetals crosslinked with polyaldehydes), in EP 1622946 A1 (polyvinyl acetals crosslinked with glutardialdehyde) and in WO 03/020776 A1 (polyvinyl acetals crosslinked with glyoxylic acid). The disclosure of these patent applications is incorporated herein fully by way of reference. The crosslinking of the polyvinyl acetal is evidenced macroscopically by increased molecular weight and increased viscosity of an ethanol solution.

In a third variant of the invention, the properties of the polyvinyl acetals used in accordance with the invention are set by the acetalation conditions during production thereof. When producing polyvinyl acetals, a mixture of polyvinyl alcohol and aldehyde or of polyvinyl alcohol and an acid, such as HCl, is normally provided and is reacted by adding an acid or aldehyde at a temperature of 0 to 20° C. with precipitation of the polyvinyl acetal (precipitation phase). The precipitation phase starts with the addition of the latter component (acid or aldehyde) and generally lasts between 60 and 360 minutes, preferably between 60 and 240 minutes. The precipitation phase ends with the onset of heating to the end temperature.

The onset of heating is the start of the heating phase. The reaction is then completed at an end temperature of 30 to 80° C., after which the reaction mixture is cooled and the polyvinyl acetal is separated and processed. The heating phase ends with the onset of cooling and generally lasts between 30 and 300 minutes.

Polyvinyl acetals particularly suitable for the composite glass laminates according to the invention are produced by methods comprising the following steps:

providing an aqueous solution of polyvinyl alcohol and at least one aldehyde addition of an acid with precipitation of the polyvinyl acetal at low temperature (precipitation phase), the precipitation phase lasting between 60 and 360 min, preferably between 60 and 240 min.

Alternatively, the precipitation phase can also be carried out as follows:

providing an aqueous solution of polyvinyl alcohol and acid addition of at least one aldehyde with precipitation of the polyvinyl acetal at low temperature (precipitation phase), the precipitation phase lasting between 60 and 360 min, preferably between 60 and 240 min.

In both variants, acid and aldehyde can be added once or in a number of steps.

In both variants, the following method step is then carried out (heating phase);

heating the reaction mixture to an increased temperature subsequent heating at increased temperature, the entire heating phase lasting between 30 and 300 min.

Polyvinyl acetals suitable for the present invention are produced with a precipitation phase which lasts considerably longer compared to the heating phase, for example as described in DE 2838025, U.S. Pat. No. 5,187,217, EP 1384731, WO2004/005358, EP 0211819, JP 01318009 or WO 2005 070669, the disclosures of which are incorporated herein fully by way of reference. The polyvinyl acetals obtained therefore most preferably have the lower limits already described for molecular weight Mw and solution viscosity.

In a fourth variant of the invention, polyvinyl acetals which are particularly suitable for the present invention are obtained by the combination of a production process with a long precipitation phase, as in the third variant, with a crosslinking reaction, for example by thermal self-crosslinking of polyvinyl acetals containing carboxyl groups, or by crosslinking of polyvinyl acetals with polyaldehydes, glutardialdehyde or glyoxylic acid. The crosslinking reaction can take place during the production of the polyvinyl acetal (that is to say during the reaction of polyvinyl alcohol with aldehyde) by simultaneous addition of the aldehyde and of the crosslinking agent, or else in a separate reaction step, such as the addition of the crosslinking agent during the extrusion of the film containing softening agent(s). The polyvinyl acetals thus obtained most preferably have the lower limits already described for molecular weight Mw and solution viscosity.

Irrespective of the production method and of crosslinking, and in addition to the acetal units, the polyvinyl acetals used in accordance with the invention also comprise units resulting from vinyl acetate and vinyl alcohol and may possibly also comprise further comonomers.

The polyvinyl acetate fraction of the polyvinyl acetals used in accordance with the invention is preferably below 14% by weight, more preferably below 10% by weight, yet more preferably below 5% by weight, and in particular below 2% by weight.

The degree of acetalation can be established mathematically from the polyvinyl alcohol fraction and from the residual acetate content.

The films used in accordance with the invention preferably also have moisture or water contents in the edge region of a CSG of at most 2.3% by weight, at most more preferably 2.0% by weight, yet more preferably at most 1.8% by weight, and most preferably of at most 1.5% by weight, even under humid conditions, thus resulting in improved resistance to delamination and a reduced tendency for film turbidity.

The films preferably have a softening agent content in the range of 18 to 32% by weight, more preferably in the range of 20 to 30% by weight, yet more preferably in the range of 22 to 28% by weight and in particular in the range of 24 to 27% by weight. Films used in accordance with the invention may contain one or more softening agents.

Softening agents of which the polarity, expressed by the formula $100 \times O/(C+H)$, is less than or equal to 9.4, wherein O, C and H stand for the number of oxygen, carbon and hydrogen atoms in the respective molecule, are particularly suitable in accordance with the invention. The table below shows softening agents which can be used in accordance with the invention and the polarity values thereof according to the formula $100 \times O/(C+H)$.

| Name | Abbreviation | Polarity |
|---|---|---|
| di-2-ethylhexyl sebacate | (DOS) | 5.3 |
| 1,2-cyclohexanedicarboxylic acid diisononyl ester | (DINCH) | 5.4 |
| di-2-ethylhexyl adipate | (DOA) | 6.3 |
| di-2-ethyl hexyl phthalate | (DOP) | 6.5 |
| dihexyl adipate | (DHA) | 7.7 |
| dibutyl sebacate | (DBS) | 7.7 |
| di-2-butoxyethyl sebacate | (DBES) | 9.4 |
| triethylene glycol bis(2-ethylhexanoate) | (3G8) | 9.4 |

The following softening agents are less suitable

| Name | Abbreviation | Polarity |
|---|---|---|
| triethylene glycol-bis-n-heptanoate | 3G7 | 10.3 |
| tetraethylene glycol-bis-n-heptanoate | 4G7 | 10.9 |
| di-2-butoxyethyl adipate | DBEA | 11.5 |
| di-2-butoxyethoxyethyl adipate | DBEEA | 12.5 |

The films used in accordance with the invention most preferably contain cyclohexanedicarboxylic acid esters, in particular DINCH, as softening agents. DINCH can be used as the only softening agent or in combination with at least one further apolar or polar softening agent(s), suitable as an additional softening agent, in a fraction of 1 to 40% by weight.

The films preferably have a total softening agent content, that is to say the fraction of all softening agents in the film, in order of increasing preference, in a range of 10 to 40% by weight, 14 to 34% by weight, 16 to 32% by weight, 18 to 30% by weight, and in particular 22 to 28% by weight.

In the case of mixtures of cyclohexanedicarboxylic acid ester softening agents, the fraction thereof, based on the mixture, can, in order of increasing preference be over 10%, over 20%, over 30%, over 40%, over 50%, over 60%, over 70%, over 80%, or over 90%.

The films according to the invention most preferably contain a softening agent mixture of adipate dialkyl esters, such as di-isononyl adipate or dinonyl adipate, with hydrogenated alkyl phthalates and/or hydrogenated alkyl terephthalates at a mass ratio of 20:80 to 80:20, more preferably 30:70 to 70:30, and in particular 40:60 to 60:40 or 50:50. Di-isononyl adipate or dinonyl adipate (DINA) is most preferably used as an adipate dialkyl ester, and DINCH at the aforementioned mass ratios is most preferably used as a hydrogenated phthalate.

With use of the aforementioned softening agent or softening agent combinations, it is possible to produce films having particularly low softening agent release, which, during subsequent processing, provides the advantage of reduced unpleasant odour and likelihood of occurrence of softening agent aerosols and provides the advantage of increased durability in the finished CSG.

The softening agent release of the films used in accordance with the invention (as defined hereinafter) is preferably less than 4% by weight, more preferably less than 3% by weight, yet more preferably less than 2% by weight and most preferably less than 1% by weight, in each case based on the overall film.

Films used in accordance with the invention have a low tendency to creep at increased temperature. At the same time, however, the melt behaviour during processing so as to form a composite glass laminate is sufficient to maintain a bubble-free and fully bonded laminate. Composite glass laminates according to the invention therefore preferably contain films formed of polyvinyl acetal containing softening agent(s) with a melt flow index (MFR) according to ISO 1133 at 100° C./21.6 kg of less than or equal to 340 mg/10 min, more preferably of less than or equal to 260 mg/10 min. The melt flow index (MFR) according to ISO 1133 at 100° C./21.6 kg is determined on a mixture of polyvinyl acetal containing 26% by weight DINCH as a softening agent. The polyvinyl acetals used in accordance with the invention have a melt flow index MFR at 150° C./5 kg of less than 70 mg/10 min.

The ability of polyvinyl acetal films to adhere to glass is normally adjusted by the addition of adhesion regulators, such as the alkali and/or alkaline earth salts of organic acids disclosed in WO 03/033583 A1. Potassium acetate and/or magnesium acetate have proven to be particularly suitable. In addition, polyvinyl acetals from the production process often contain alkali and/or alkaline earth salts of inorganic acids, such as sodium chloride.

To set the desired adhesion to glass, the films according to the invention can contain alkali metal ions, alone or in combination, in a range of 0 to 300 ppm, preferably 0 to 200 ppm, more preferably 0 to 100 ppm, and most preferably 0 to 50 ppm. Alkaline earth metal ions or zinc ions can be contained, alone or in combination, in an amount of 0 to 150 ppm, preferably 5 to 100 ppm, and more preferably 10 to 65 ppm. A low content of alkali metal ions can be achieved by appropriate washing methods of the polyvinyl acetal and by the use of particularly effective non-stick agents, such as the magnesium, calcium and/or zinc salts of organic acids (for example acetates) known to one skilled in the art.

The films used in accordance with the invention preferably have a specific alkalinity, expressed as alkali titre, which should lie in a range of from 2 to 100, preferably 5 to 70, and more preferably 5 to 50. A maximum alkali titre of 100 should not be exceeded. As described hereinafter, the alkali titre is determined by back titration of the film and can be adjusted by adding alkali substances, such as metal salts of organic carboxylic acids containing 1 to 15 carbon atoms, in particular alkali or earth alkaline salts, such as magnesium or potassium acetate. The alkali compound is normally used in a concentration of 0.005 to 2% by weight, in particular 0.05 to 1% by weight, based on the total mixture.

Furthermore, the adhesion to glass, which is dependent on the water content of the film, can be influenced by the addition of pyrogenic silicic acid. The films based on polyvinyl acetal and containing softening agent(s) preferably contain 0.001 to 15% by weight, preferably 0.5 to 5% by weight pyrogenic $SiO_2$.

For example, the production and composition of films based on polyvinyl acetals is described in principle in EP 185 863 B1, EP 1 118 258 B1, WO 02/102591 A1, EP 1 118 258 B1 or EP 387 148 B1.

The thickness of the films based on polyvinyl acetal and containing softening agent(s) is between 0.15 and 2.5 mm.

To laminate the layered assembly thus obtained, the methods with which those skilled in the art are familiar can be used, with and without prior production of a pre-composite.

"Autoclave processes" are carried out at an increased pressure of approximately 10 to 15 bar and at temperatures of 130 to 145° C. over approximately 2 hours. Vacuum bag or vacuum ring methods, for example according to EP 1 235 683 B1, are carried out at approximately 200 mbar and 130 to 145° C.

Vacuum laminators are preferably used to produce the composite glass laminate according to the invention. These consist of a chamber which can be heated and evacuated and in which composite glazings can be laminated within 30 to 60 minutes. Reduced pressures of 0.01 to 300 mbar and temperatures of 100 to 200° C., in particular 130 to 160° C., have proven to be effective in practice.

Alternatively, a layered assembly formed as described above can be compressed between at least one pair of rolls at a temperature of 60 to 150° C. to form a composite safety glass according to the invention. Systems of this type are known for the production of solar modules and normally have at least one heating tunnel before and after the first pressing plant in systems having two pressing plants.

Composite glass laminates according to the invention can be used as façade components, roof panes, winter garden coverings, soundproofing walls, balcony or railing elements, components of window areas, or as vehicle glazing.

Measurement Methods

The glass transition temperature of the film was determined by means of differential scanning calorimetry (DSC) according to DIN 53765 with use of a heating rate of 10 K/min at a temperature interval of –50° C. to 150° C. A first heating ramp, followed by a cooling ramp, followed by a second heating ramp was used. The position of the glass transition temperature was established from the measured curve associated with the second heating ramp in accordance with DIN 51007. The DIN midpoint (Tg DIN) was defined as the point of intersection of a horizontal line at half step height with the measured curve. The step height was defined by the vertical distance of the two points of intersection of the middle tangent with the base lines of the measured curve before and after glass transition.

The flow behaviour of the film was determined as melt flow index (melt flow rate: MFR) in accordance with ISO 1133 using a suitable instrument, for example from Göttfert, model MI2. The MFR value was specified at the appropriate temperatures, for example of 100° C. and 140° C. with the 2 mm nozzle with a weight loading of 21.6 kg in grams per 10 minutes (g/10 min).

The polyvinyl alcohol and polyvinyl acetate contents of the polyvinyl acetals were determined in accordance with ASTM D 1396-92.

The metal ion content was analysed by means of atomic absorption spectroscopy (AAS).

The molecular weight Mw (=weight average) of the polyvinyl acetals was determined by means of gel permeation chromatography (GPC) in pure acetic acid with use of RI detectors. The detectors were calibrated by means of PVB standard gauge, the absolute values of which were established by means of static light scattering.

The solution viscosity of the polyvinyl acetals was measured in accordance with DIN 53015 at 20° C. in a mixture of 95 parts ethanol and 5 parts water. The solid content of the viscosity solution was 5% by weight.

The solution viscosity of the polyvinyl alcohols was measured in accordance with DIN 53015 at 20° C. in water. The solid content of the viscosity solution was 4% by weight.

The water or moisture content of the films was determined by the Karl Fischer method in % by weight. In order to simulate the moistening behaviour under humid conditions, the film was stored beforehand for 24 h at 23° C. and 85% RH. The method can be performed on both the unlaminated film and on a laminated composite glass as a function of the distance to the edge of the film.

Softening agent release from the PVB film was established by way of experiment under conditions which are inspired by a procedure in a vacuum laminator, as is used for the production of CSG. To this end, a circular blank having a diameter of 60 mm was cut or produced from a 0.76 mm thick film/sample and was placed flat on the base of a tared aluminium shell having a diameter of 65 mm (neoLab aluminium shell, smooth, 65 mm, product no. 2-1605, weight approximately 2.5 g). The sample was conditioned in the shell overnight in a climate of 23° C./25% RH and was then left in a vacuum drying cupboard (Heraeus, model VTR 5022) for 30 minutes at 150° C. and 1 mbar. The shell was conditioned again overnight at 23° C./25% RH before being re-weighed. The ascertained weight loss based on the original weight of the film in percent was defined as softening agent release.

Test for Tendency to Creep

Figure 2:
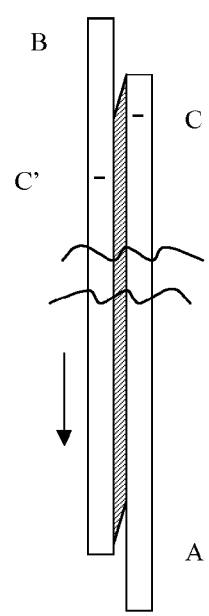

The tendency to creep of the films was determined on test laminates which were produced from two pieces of float glass 3 mm thick and measuring 150×300 mm along the edges with an interposed laminated film 0.76 thick, in such a way that the two glasses were offset from one another by 2 cm lengthwise (A/B in FIGS. 1 and 2). The film to be examined in terms of tendency to creep was conditioned overnight in a climate of 23° C./23% RH before production of the laminate.

The two protruding glass portions were not covered by the film, that is to say the laminated intermediate layer merely had a length of 28 cm. The test laminates were marked with a line using a pen on either side exactly opposite one another, and these marks were later used as a basis to easily measure the resultant displacement caused by slip (C in FIG. 1). The test laminates were placed or fixed vertically in a heating cupboard at 100° C. so that the front pane, not touching the base (B in FIGS. 1 and 2), could slide freely under its own weight, that is to say was only held by the intermediate film and also was only contacted thereby so that the result was not falsified by the effects of friction. After 7 days (one week), the test laminates were examined for any displacement by measuring the distance between the two markings using a ruler (C and C' in FIG. 2).

Examples

Films 0.76 mm thick were produced using the mixtures of the compositions shown in the tables below and, as a laminate between two panes of Planilux 3 mm thick, their suitability for production of composite glass laminates in terms of their tendency to creep was examined.

It was found that the films used in accordance with the invention can be processed effectively to form composite glass laminates and, due to low creep values (=slip) at 100° C., have a low level of flowability at this temperature so that a composite glass laminate which is stable under environmental and mechanical influences is obtained.

A comparison of the MFR values under different measurement conditions (100° C., 21.6 kg vs 150° C., 5 kg) of examples B2, B9 and B17 shows that the polymers according to the invention have different melt flow properties and therefore different creep properties compared to the polyvinyl butyrals described in US 2009/250100.

Films having the described flowabilities are particularly suitable for the production of composite glass laminates having thick (at least 3 mm) individual glass panes, since they do not exhibit any slip of the glass panes in relation to the adhesive film, but nevertheless can be processed effectively.

The following abbreviations are used:
DINCH 1,2-cyclohexanedicarboxylic acid diisononyl ester
3G8 triethylene glycol bis(2-ethylhexanoate)
PVB polyvinyl butyral with the PVA content given Comparative Example 1

100 parts by weight of the polyvinyl alcohol Mowiol 28-99 (commercial product from Kuraray Europe GmbH) were dissolved in 1075 parts by weight of water with heating to 90° C. 56.8 parts by weight of n-butyraldehyde were added at a temperature of 40° C. and 75 parts by weight of 20% hydrochloric acid were added at a temperature of 12° C., with stirring, over 6 min, after which the polyvinyl butyral (PVB) precipitated. The mixture was then kept at 12° C., with stirring, for a further 15 min, then heated to 69° C. over 80 min and kept at this temperature for 120 min. The PVB was separated after cooling to room temperature, washed neutral with water and dried. A PVB having a polyvinyl alcohol content of 20.2% by weight and a polyvinyl acetate content of 1.5% by weight was obtained.

290 g of the PVB thus obtained and 100 g of softening agent 3G8 and 10 g of softening agent DBEA were mixed in a laboratory mixer (manufacturer: Brabender, model 826801). The mixture obtained was extruded to form a flat film having a thickness of 0.8 mm. Extrusion was carried out using a twin screw extruder with screws turning in opposite directions (manufacturer: Haake, System Rhecord 90) and equipped with a melt pump and wide-slotted die. The cylinder temperature of the extruder was 220° C., the nozzle temperature was 150° C.

Comparative Example 2

During polymer synthesis, 63.9 parts by weight of n-butyraldehyde were used. During film production, 370 g of PVB and 130 g of softening agent DINCH were used. For the rest, the procedure according to Comparative example 1 was followed.

Comparative Examples 3 to 4

During polymer synthesis, 66.3 and 68.4 parts by weight of n-butyraldehyde were used respectively. For the rest, the procedure according to Comparative example 2 was followed.

Examples 1, 2 and 3

During polymer synthesis, 100 parts by weight of the polyvinyl alcohol Mowiol 56-98 (commercial product from Kuraray Europe GmbH), 1333 parts by weight of water and 67.9, 68.4 and 69 parts by weight of n-butyraldehyde were used respectively. For the rest, the procedure according to Comparative example 2 was followed.

Examples 4 and 5

During polymer synthesis, 100 parts by weight of the polyvinyl alcohol Kuraray Poval 624 (commercial product from Kuraray Co. Ltd), 1333 parts by weight of water, 100 parts by weight of 20% hydrochloric acid, and 70 and 73 parts by weight of n-butyraldehyde were used respectively. For the rest, the procedure according to Comparative example 2 was followed.

Comparative Example 5

During film production, a mixture of 333 g PVB from Comparative example 4 and 37 g PVB from Example 2 were used. For the rest, the procedure according to comparative example 2 was followed.

Example 6

During film production, a mixture of 259 g PVB from Comparative example 4 and 111 g PVB from Example 2 were used. For the rest, the procedure according to Comparative example 2 was followed.

Example 7

During film production, a mixture of 185 g PVB from Comparative example 4 and 185 g PVB from Example 2 were used. For the rest, the procedure according to Comparative example 2 was followed.

Example 8

During film production, a mixture of 185 g PVB from Comparative example 4 and 185 g PVB from Example 3 were used. For the rest, the procedure according to Comparative example 2 was followed.

Examples 9 to 12

During polymer synthesis, 68.4 parts by weight of n-butyraldehyde and additionally 0.02, 0.04, 0.06 and 0.08 parts by weight of glutaraldehyde were used respectively. For the rest, the procedure according to Comparative example 2 was followed.

Examples 13 to 14

During polymer synthesis, 100 parts by weight of the polyvinyl alcohol Mowiol 30-92 (commercial product from Kuraray Europe GmbH), 1075 parts by weight of water, 67.1 parts by weight of n-butyraldehyde, 100 parts by weight of 20% hydrochloric acid, and 0.04 and 0.08 parts by weight of glutaraldehyde were used respectively. For the rest, the procedure according to Comparative example 2 was followed.

Example 15

100 parts by weight of the polyvinyl alcohol Mowiol 28-99 (commercial product from Kuraray Europe GmbH) were dissolved in 1075 parts by weight of water with heating to 90° C. 68.4 parts by weight of n-butyraldehyde were added at a temperature of 40° C. and 15 parts by weight of 20% hydrochloric acid were added at a temperature of 12° C., with stirring, over 15 min, after which the polyvinyl butyral (PVB) precipitated. The mixture was then kept at 12° C., with stirring, for 60 min. A further 50 parts by weight of 20% hydrochloric acid were then added over 40 min. The mixture was then kept at 12° for a further 15 min, with stirring, then heated to 69° C. over 80 min and kept at this temperature for 120 min. For the rest, the procedure according to Comparative example 2 was followed.

Examples 16 to 17

The break after addition of the first amount of the acid was 120 and 180 min respectively. For the rest, the procedure according to Example 15 was followed.

Example 18

100 parts by weight of the polyvinyl alcohol Mowiol 28-99 (commercial product from Kuraray Europe GmbH) were dissolved in 1075 parts by weight of water with heating to 90° C. 68.4 parts by weight of n-butyraldehyde and 0.03 parts by weight of glutaraldehyde were added at a temperature of 40° C. 75 parts by weight of 20% hydrochloric acid were added at a temperature of 12° C., with stirring, over 6 min, after which the polyvinyl butyral (PVB) precipitated. The mixture was then kept at 12° C., with stirring, for a further 120 min, then heated to 69° C. over 80 min and kept at this temperature for 120 min. For the rest, the procedure according to Comparative example 2 was followed.

Example 19

100 parts by weight of the polyvinyl alcohol Mowiol 28-99 (commercial product from Kuraray Europe GmbH) were dissolved in 1075 parts by weight of water with heating to 90° C. 68.4 parts by weight of n-butyraldehyde and 0.03 parts by weight of glutaraldehyde were added at a temperature of 40° C. 15 parts by weight of 20% hydrochloric acid were added at a temperature of 12° C., with stirring, over 15 min, after which the polyvinyl butyral (PVB) precipitated. The mixture was then kept at 12° C., with stirring, for 120 min. 50 parts by weight of 20% hydrochloric acid were then added over 40 min. The mixture was then kept at 12° C., with stirring, for a further 15 min, then heated to 69° C. over 80 min and kept at this temperature for 120 min. For the rest, the procedure according to Comparative example 2 was followed.

Examples 20 to 21

100 parts by weight of the polyvinyl alcohol Mowiol 30-92 (commercial product from Kuraray Europe GmbH) were dissolved in 1075 parts by weight of water with heating to 90° C. 67.1 parts by weight of n-butyraldehyde and 0.06 parts by weight of glutaraldehyde were added at a temperature of 40° C. 100 parts by weight of 20% hydrochloric acid were added at a temperature of 12° C., with stirring, over 6 min, after which the polyvinyl butyral (PVB) precipitated. The mixture was then kept at 12° C., with stirring, for a further 60 and 120 min respectively, then heated to 69° C. over 80 min and kept at this temperature for 120 min. For the rest, the procedure according to Comparative example 2 was followed.

TABLE 1

|  | Example | | | | |
|---|---|---|---|---|---|
|  | CE 1 | CE 2 | CE 3 | CE 4 | CE 5 |
| PVB | | | | | |
| Viscosity PVA 4% (mPa · s) | 27.06 | 27.06 | 27.06 | 27.06 | — |
| Precipitation phase [min] | 21 | 21 | 21 | 21 | — |
| Heating phase [min] | 200 | 200 | 200 | 200 | — |
| Polyvinyl alcohol content [w %] | 20.2 | 16.0 | 15.0 | 14.3 | 14.4 |
| Polyvinyl acetate content [w %] | 1.5 | 0.9 | 1.1 | 0.9 | 1.0 |
| Butyral content [w %] | 78.3 | 83.1 | 83.9 | 84.8 | 84.6 |
| Polyvinyl alcohol content [mol %] | 29.1 | 23.5 | 22.2 | 21.2 | 21.4 |
| Polyvinyl acetate content [mol %] | 1.1 | 0.7 | 0.8 | 0.7 | 0.8 |
| Butyral content [mol %] | 69.8 | 75.8 | 77.0 | 78.1 | 77.9 |
| Viscosity PVB 5% (mPa · s) | 81.4 | 68.2 | 70 | 72.9 | 90.1 |
| MFR 100° C./21.6 kg [mg/10 min] | | | | | |
| MFR 150° C./5 kg [mg/10 min] | | | | | |
| Film | | | | | |
| Softening agent | 3G8/DBEA (10:1) | DINCH | DINCH | DINCH | DINCH |
| Softening agent [w %] | 27.5 | 26.0 | 26.0 | 26.0 | 26.0 |
| Tg, Midpoint DIN [° C.] | 18.8 | 24.99 | 23.47 | 21.73 | — |
| Mw, PVB [g/mol] | 103000 | 103800 | 103000 | 101950 | 106000 |
| MFR 100° C./21.6 kg [mg/10 min] | 165 | 397 | 465 | 378 | 351 |
| Water content acc. to Karl Fischer in wt. % | 3.09 | 1.87 | 1.73 | 1.87 | 1.67 |
| Slip in mm | 0 | 8.5 | 9 | 7 | 5 |

TABLE 2

|  | Example | | | | | |
|---|---|---|---|---|---|---|
|  | E 1 | E 2 | E 3 | E 4 | E 5 | E 6 |
| PVB | | | | | | |
| Viscosity PVA 4% (mPa · s) | 56.36 | 56.36 | 56.36 | 55.92 | 55.92- | — |
| Precipitation phase [min] | 21 | 21 | 21 | 21 | 21 | — |
| Heating phase [min] | 200 | 200 | 200 | 200 | 200 | — |
| Polyvinyl alcohol content [w %] | 15.6 | 15.0 | 14.1 | 13.5 | 12.7 | 14.5 |
| Polyvinyl acetate content [w %] | 2.0 | 2.1 | 1.9 | 5.4 | 5.7 | 1.3 |
| Butyral content [w %] | 82.4 | 83.0 | 84.0 | 81.1 | 81.6 | 84.2 |
| Polyvinyl alcohol content [mol %] | 23.0 | 22.2 | 21.0 | 20.3 | 19.2 | 21.5 |
| Polyvinyl acetate content [mol %] | 1.5 | 1.6 | 1.5 | 4.1 | 4.4 | 1.0 |
| Butyral content [mol %] | 75.5 | 76.2 | 77.6 | 75.6 | 76.4 | 77.5 |
| Viscosity PVB 5% (mPa · s) | 179.8 | 177.3 | 177.8 | 195.8 | 205.9 | 105.5 |
| MFR 100° C./21.6 kg [mg/10 min] | | 83 | | | | |
| MFR 150° C./5 kg [mg/10 min] | | 12 | | | | |
| Film | | | | | | |
| Softening agent | DINCH | DINCH | DINCH | DINCH | DINCH | DINCH |
| Softening agent [w %] | 26.0 | 26.0 | 26 | 26 | 26 | 26.0 |
| Tg, Midpoint DIN [° C.] | 23.81 | 24.16 | — | — | — | — |
| Mw, PVB [g/mol] | 143300 | 144300 | 143775 | 150800 | 150200 | 113500 |
| MFR 100° C./21.6 kg [mg/10 min] | 88 | 83 | 97 | 84 | 97 | 263 |
| Water content acc. to Karl Fischer in wt. % | 1.79 | 1.76 | 1.7 | 1.61 | 1.55 | 1.69 |
| Slip in mm | 1 | 1 | 0 | 1 | 1 | 2 |

TABLE 3

|  | Example | | | | | |
|---|---|---|---|---|---|---|
|  | E 7 | E 8 | E 9 | E 10 | E 11 | E 12 |
| PVB | | | | | | |
| Viscosity PVA 4% (mPa · s) | — | — | 26.8 | 27.06 | 27.06 | 27.06 |
| Precipitation phase [min] | — | — | 21 | 21 | 21 | 21 |
| Heating phase [min] | — | — | 200 | 200 | 200 | 200 |
| Polyvinyl alcohol content [w %] | 14.7 | 14.2 | 14.5 | 14.5 | 14.2 | 14.4 |
| Polyvinyl acetate content [w %] | 1.5 | 1.4 | 1.2 | 0.9 | 1.0 | 0.9 |

TABLE 3-continued

|  | Example | | | | | |
|---|---|---|---|---|---|---|
|  | E 7 | E 8 | E 9 | E 10 | E 11 | E 12 |
| Butyral content [w %] | 83.8 | 84.4 | 84.3 | 84.6 | 84.8 | 84.7 |
| Polyvinyl alcohol content [mol %] | 21.8 | 21.1 | 21.5 | 21.6 | 21.2 | 21.3 |
| Polyvinyl acetate content [mol %] | 1.1 | 1.1 | 0.9 | 0.7 | 0.8 | 0.7 |
| Butyral content [mol %] | 77.1 | 77.8 | 77.6 | 77.8 | 78.1 | 78.0 |
| Viscosity PVB 5% (mPa · s) | 120 | 120 | 79.8 | 90.9 | 103.7 | 120.5 |
| MFR 100° C./21.6 kg [mg/10 min] |  |  | 340 |  |  |  |
| MFR 150° C./5 kg [mg/10 min] |  |  | 63 |  |  |  |
| Film |  |  |  |  |  |  |
| Softening agent | DINCH | DINCH | DINCH | DINCH | DINCH | DINCH |
| Softening agent [w %] | 26.0 | 26 | 26.0 | 26.0 | 26.0 | 26.0 |
| Tg, Midpoint DIN [° C.] | — | — | 23.69 | — | — | — |
| Mw, PVB [g/mol] | 122300 | 122400 | 111450 | 127200 | 141850 | 159600 |
| MFR 100° C./21.6 kg [mg/10 min] | 172 | 180 | 340 | 227 | 189 | 105 |
| Water content acc. to Karl Fischer in wt. % | 1.69 | 1.64 | 1.62 | 1.63 | 1.72 | 1.67 |
| Slip in mm | 1 | 0 | 4 | 1 | 1 | 0 |

TABLE 4

|  | Example | | | | | |
|---|---|---|---|---|---|---|
|  | E 13 | E 14 | E 15 | E 16 | E 17 | E 18 |
| PVB |  |  |  |  |  |  |
| Viscosity PVA 4% (mPa · s) | 30.75 | 30.75 | 27.06 | 27.06 | 27.06 | 27.06 |
| Precipitation phase [min] | 21 | 21 | 115 | 175 | 235 | 126 |
| Heating phase [min] | 200 | 200 | 200 | 200 | 200 | 200 |
| Polyvinyl alcohol content [w %] | 11.1 | 11.3 | 14.5 | 15.1 | 14.8 | 15.0 |
| Polyvinyl acetate content [w %] | 9.0 | 8.8 | 1.0 | 0.9 | 0.9 | 1.0 |
| Butyral content [w %] | 79.9 | 79.9 | 84.5 | 84.0 | 84.2 | 84.0 |
| Polyvinyl alcohol content [mol %] | 17.0 | 17.3 | 21.5 | 22.3 | 22.0 | 22.2 |
| Polyvinyl acetate content [mol %] | 7.1 | 6.9 | 0.7 | 0.7 | 0.7 | 0.8 |
| Butyral content [mol %] | 75.9 | 75.8 | 77.7 | 77.0 | 77.3 | 77.0 |
| Viscosity PVB 5% (mPa · s) | 111.6 | 152.1 | 83.6 | 87.8 | 88.3 | 90.4 |
| MFR 100° C./21.6 kg [mg/10 min] |  |  |  |  | 116 |  |
| MFR 150° C./5 kg [mg/10 min] |  |  |  |  | 34 |  |
| Film |  |  |  |  |  |  |
| Softening agent | DINCH | DINCH | DINCH | DINCH | DINCH | DINCH |
| Softening agent [w %] | 26 | 26 | 26.0 | 26 | 26 | 26 |
| Tg, Midpoint DIN [° C.] | — | — | 22.08 | — | — | — |
| Mw, PVB [g/mol] | 141800 | 172400 | 102525 | 103225 | 102075 | 116700 |
| MFR 100° C./21.6 kg [mg/10 min] | 221 | 103 | 156 | 131 | 116 | 253 |
| Water content acc. to Karl Fischer in wt. % | 1.52 | 1.54 | 1.64 | 1.68 | 1.7 | 1.78 |
| Slip in mm | 3 | 0 | 1 | 0 | 0 | 2 |

TABLE 5

|  | Example | | |
|---|---|---|---|
|  | E 19 | E 20 | E 21 |
| PVB |  |  |  |
| Viscosity PVA 4% (mPa · s) | 27.06 | 30.75 | 30.75 |
| Precipitation phase [min] | 175 | 106 | 166 |
| Heating phase [min] | 200 | 200 | 200 |
| Polyvinyl alcohol content [w %] | 14.7 | 11.8 | 11.6 |
| Polyvinyl acetate content [w %] | 1.1 | 9.2 | 9.6 |
| Butyral content [w %] | 84.2 | 79.0 | 78.8 |
| Polyvinyl alcohol content [mol %] | 21.8 | 18.0 | 17.8 |
| Polyvinyl acetate content [mol %] | 0.8 | 7.2 | 7.5 |
| Butyral content [mol %] | 77.4 | 74.8 | 74.7 |
| Viscosity PVB 5% (mPa · s) | 102.6 | 131.6 | 124.2 |
| MFR 100° C./21.6 kg [mg/10 min] |  |  |  |
| MFR 150° C./5 kg [mg/10 min] |  |  |  |
| Film |  |  |  |
| Softening agent | DINCH | DINCH | DINCH |
| Softening agent [w %] | 26 | 26 | 26 |
| Tg, Midpoint DIN [° C.] | — | — | — |
| Mw, PVB [g/mol] | 115400 | 160500 | 155400 |
| MFR 100° C./21.6 kg [mg/10 min] | 106 | 121 | 181 |
| Water content acc. to Karl Fischer in wt. % | 1.68 | 1.54 | 1.5 |
| Slip in mm | 0 | 0 | 1 |

The invention claimed is:

1. A composite glass laminate comprising a layered assembly formed of at least two glass panes having at least one interposed film formed of polyvinyl acetal containing softening agent(s) between the panes, wherein the film contains polyvinyl acetal(s) having a polyvinyl alcohol fraction of 12 to 16% by weight and has a tendency to creep, determined on a laminate having a structure formed of 3 mm float glass/0.76 mm film/3 mm float glass, of less than 5 mm at a temperature of 100° C. after 7 days, the polyvinyl acetal having a weight average molecular weight Mw of more than 110,000 g/mol and a solution viscosity of more than 80 mPas.

2. The composite glass laminate of claim 1, wherein a polyvinyl acetal is crosslinked by carboxyl groups, by polyaldehydes, by glutardialdehyde or glycoxylic acid.

3. The composite glass laminate of claim 1, wherein the polyvinyl acetals are produced by a method comprising the following steps:
   a) providing an aqueous solution of polyvinyl alcohol and at least one aldehyde;
   b) adding an acid followed by separation of the polyvinyl acetal at low temperature in a precipitation phase; and
   c) heating a reaction mixture obtained from step b) to an increased temperature in a heating phase;
wherein the precipitation phase lasts from 60 to 360 min.

4. The composite glass laminate of claim 1, wherein the polyvinyl acetals are produced by a method comprising the following steps:
   a) providing an aqueous solution of polyvinyl alcohol and acid;
   b) adding at least one aldehyde followed by separation of the polyvinyl acetal at low temperature in a precipitation phase; and
   c) heating a reaction mixture obtained from step b) to an increased temperature in a heating phase,
wherein the precipitation phase lasts from 60 to 360 min.

5. The composite glass laminate of claim 1, wherein the film formed of polyvinyl acetal containing softening agent has a melt flow index (MFR) of less than or equal to 340 mg/10 min according to ISO 1133 at 100° C./21.6 kg.

6. The composite glass laminate of claim 1, wherein the films based on polyvinyl acetal containing softening agent have a softening agent content of 18 to 32% by weight.

7. The composite glass laminate of claim 1, wherein one or more compounds having a polarity, expressed by the formula 100×O/(C+H) is less than or equal to 9.4, wherein O, C and H stand for the number of oxygen, carbon and hydrogen atoms in the respective molecule, is/are used as a softening agent.

8. The composite glass laminate of claim 1, wherein one or more compounds selected from the group consisting of di-2-ethylhexyl sebacate, di-2-ethylhexyl adipate, dihexyl adipate, dibutyl sebacate, di-2-butoxyethyl sebacate, triethylene glycol bis(2-ethylhexanoate), di-isononyl adipate, dinonyl adipate and 1,2-cyclohexanedicarboxylic acid diisononyl ester is/are used as a softening agent.

9. The composite glass laminate of claim 1, wherein the film based on polyvinyl acetal and containing softening agent(s) further comprises 0.001 to 5% by weight $SiO_2$.

10. The composite glass laminate of claim 1, wherein at least one of the glass panes of the layered assembly has a thickness of at least 3 mm.

11. The composite glass laminate of claim 1, wherein polyvinyl butyral is used as a polyvinyl acetal.

* * * * *